United States Patent
Kohno et al.

(10) Patent No.: US 7,365,786 B2
(45) Date of Patent: Apr. 29, 2008

(54) SOLID STATE IMAGE SENSING APPARATUS WITH ENHANCED SENSITIVITY REALIZED BY IMPROVING LINEAR CHARACTERISTIC OF PHOTODIODE AND ITS DRIVING METHOD

(75) Inventors: Akiyoshi Kohno, Yokohama (JP); Nobuhiko Mutoh, Kyoto (JP); Takeshi Fujita, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 746 days.

(21) Appl. No.: 10/832,249

(22) Filed: Apr. 27, 2004

(65) Prior Publication Data
US 2004/0211885 A1    Oct. 28, 2004

(30) Foreign Application Priority Data
Apr. 28, 2003    (JP)    ............... 2003-124469

(51) Int. Cl.
*H04N 5/335*    (2006.01)
(52) U.S. Cl. .................................... 348/314
(58) Field of Classification Search ............. 348/296, 348/299, 302, 314, 311, 312, 294, 322, 223.1; 250/214.1, 230, 229, 208.1; 257/223
See application file for complete search history.

(56) References Cited

U.S. PATENT DOCUMENTS

| | | | |
|---|---|---|---|
| 4,626,915 A | 12/1986 | Takatsu et al. | |
| 4,849,814 A * | 7/1989 | Van De Steeg | 348/314 |
| 5,432,551 A * | 7/1995 | Matsunaga | 348/299 |
| 5,436,476 A * | 7/1995 | Hynecek | 257/223 |
| 5,828,407 A | 10/1998 | Suzuki | |
| 6,512,544 B1 * | 1/2003 | Merrill et al. | 348/302 |
| 6,559,889 B2 * | 5/2003 | Tanaka et al. | 348/299 |
| 6,833,871 B1 * | 12/2004 | Merrill et al. | 348/302 |
| 2001/0010553 A1 | 8/2001 | Tanaka et al. | |

FOREIGN PATENT DOCUMENTS

| | | |
|---|---|---|
| JP | 09-018791 | 1/1997 |
| JP | 09-107506 | 4/1997 |
| JP | 09-163239 | 6/1997 |
| JP | 10-150183 | 6/1998 |
| JP | 2000/101929 | 4/2000 |
| JP | 2001/298667 | 10/2001 |

OTHER PUBLICATIONS

Sony ICX232BQ: "Diagonal 5mm Frame Readout CCD Image Sensor with Square Pixel for Color Cameras", May 25, 2001, pp. 1-23.

* cited by examiner

*Primary Examiner*—Tuan Ho
*Assistant Examiner*—Amy Hsu
(74) *Attorney, Agent, or Firm*—Wenderoth, Lind & Ponack, L.L.P.

(57) ABSTRACT

A driver unit of a solid state image sensing apparatus changes the substrate bias voltage from a first bias voltage to a second bias voltage which is lower than the first bias voltage and is for making a height of an overflow barrier higher than a height of the barrier in the readout gate. Moreover, the driver unit lowers the height of the overflow barrier by superimposing a saturation signal control pulse on the second bias voltage after an end of an exposure period and before sweeping out all the signal charge of vertical CCDs.

42 Claims, 15 Drawing Sheets

First field readout

Second field readout

PRIOR ART

PRIOR ART

Second bias voltage
(in the case of high overflow barrier)

Second bias voltage
(in the case of low overflow barrier)

PRIOR ART

SOLID STATE IMAGE SENSING APPARATUS WITH ENHANCED SENSITIVITY REALIZED BY IMPROVING LINEAR CHARACTERISTIC OF PHOTODIODE AND ITS DRIVING METHOD

BACKGROUND OF THE INVENTION (1) Field of the Invention

The present invention relates to a solid state image sensing apparatus with a Charge Coupled Device (CCD) that has an overflow drain (OFD) structure and its driving method.

(2) Description of the Related Art

Recently, electric devices for recording images such as digital cameras, digital video cameras and cellular phones with a camera have become popular, and image sensors such as CCD image sensors have been refined as resolution becomes higher.

FIG. 1 is a block diagram showing the structure of a conventional CCD solid state image sensing apparatus that is disclosed in patent literature and the like. In the figure, the solid state image sensor 10 comprises a plurality of photodiodes 11 that are aligned two-dimensionally, a plurality of readout gate units 12, a plurality of vertical CCDs 13, a horizontal CCD 15, an output amplifier 16, a substrate bias generating circuit 20 and a transistor Q1. The figure also shows a transistor Q2 and resistance R1 to R3 as a circuit for modulating the bias voltage Vsub of the semiconductor substrate (called a substrate bias from here) of the solid state image sensor.

The patent literature discloses a technique where the decrease in the amount of saturation signal charge at the time of reading out a frame is estimated and the expected decrement is previously increased. Reading out frames here means reading out fields field by field. In other words, signal charge in each odd line and signal charge in each even line separately with the mechanical shutter (that is not shown in the figure) closed after exposure time elapses, and the method is often used in the case of obtaining a single still picture.

A plurality of photodiodes 11 are aligned two-dimensionally so as to form an imaging area 14 in FIG. 1. Each photodiode 11 transforms the incoming light into signal charge according to the amount of light and stores the signal charge. Each photodiode 11 comprises photodiodes, for example, pn-junction photodiodes. When readout pulse XSG is applied to the readout gate unit 12, the signal charge stored in the photodiodes 11 that forms vertical lines are read out to the vertical CCDs 13.

Each vertical CCD 13 is set for each vertical line of the photodiodes 11 and vertically transfers the read out signal charge from each photodiode 11 to a horizontal CCD 15 via a read out gate unit 12. In the case of a solid state image sensor of an interline transfer (IT), vertical transmission gate electrodes, which are for performing a transmission driving by four-phase vertical transmission clock $\phi V1$ to $\phi V4$ or the like, that are repeatedly aligned in each vertical CCD 13, and signal charge that is read out from the photodiodes 11 are transferred in the vertical direction in sequence. In this way, a plurality of vertical resistors 13 outputs signal charge of a single scanning line to the horizontal resistor 15 in a horizontal blanking period. In the four-phase vertical transmission clock $\phi V1$ to $\phi V4$, $\phi V2$ in the second phase and $\phi V4$ in the fourth phase may take two values, one of which is a low level value for vertical transmission and the other one of which is a middle level value. In contrast, as vertical transmission gate electrodes corresponding to the first phase and the third phase also serve as the readout gate electrode of the readout gate unit 12, the vertical transmission clock $\phi V1$ and $\phi V3$ may take three values; they are a low level value, a middle level value and a high level value respectively. The third one, that is, the high level pulse becomes the reading out pulse XSG which is given to the readout gate unit 12.

The horizontal CCD 15 horizontally transfers charges of a single line that are transferred from a plurality of vertical CCDs 13 in the horizontal blanking period in sequence within a single horizontal scanning period and outputs them via the output amplifier 16. For example, this horizontal CCD 15 driven by the two phase horizontal transmission clock $\phi H1$ and $\phi H2$ transfers signal charge for a single line that are transferred from several vertical CCDs 13 in the horizontal direction in sequence in the horizontal scanning period after the horizontal blanking period.

The output amplifier 16 transforms the signal charge that is horizontally transferred by the horizontal CCD 15 into voltage signals in sequence and outputs them.

The substrate bias voltage generating circuit 20 generates the substrate bias voltage Vsub and applies it to the substrate 17 via the transistor Q1. This substrate bias Vsub is set as the first bias voltage when the transistor Q2 is OFF or is set as the second bias voltage with a lower voltage when the transistor Q2 is ON under the control of the VsubCont signal.

The above-mentioned solid state image sensor 10 is formed on the semiconductor substrate 17 (called substrate from here). Various kinds of timing signals such as substrate shutter pulse $\phi$ SUB for sweeping the signal charge that is stored in the photodiodes 11 to the substrate 17 are applied to the substrate 17. Note that the function of the substrate shutter function by the substrate shutter pulse $\phi$ SUB is called an electronic shutter.

FIG. 2 is a diagram showing the distribution of potential in the substrate depth direction of the photodiodes 11. The amount of charge of the signal charge "e" that is stored in the photodiodes 11 is determined based on the height of the potential barrier of the overflow barrier (OFB). In other words, the overflow barrier (OFB) is the key for determining the amount of the saturation signal charge Qs that are stored in the photodiodes 11. In the case where the amount of stored charge exceeds this amount of saturation signal charge Qs, the excessive amount of charge overflow to the substrate 17 side over the potential barrier. The potential of the overflow barrier OFB in this vertical overflow drain structure can be controlled by the overflow drain bias, that is, the substrate bias Vsub. In other words, the height of the barrier can be controlled by the substrate bias Vsub.

FIG. 3 is a time chart showing the operational timing of the solid state image sensor in reading out frames as well as controlling the substrate bias Vsub. The figure shows open/close state of the mechanical shutter, the substrate bias Vsub (substrate voltage in the figure) and vertical transmission clock $\phi V1$ and $\phi V3$ that are applied to the reading out gate electrodes between the photodiodes 11 and the vertical CCDs 13. High-level pulses respective for the vertical transmission clock $\phi V1$ and $\phi V3$ is a readout pulse XSG that is given to the readout gate electrodes.

In the monitor period, an image is read out from the solid state image sensor so as to display it on a view finder or a liquid monitor with the mechanical shutter opened and it is displayed as a moving picture (the mode is called high-speed moving picture imaging mode).

Also, in response that a user operates the shutter, imaging a still picture by reading out a frame starts (the mode for displaying is called still picture imaging mode) with a help of the mechanical shutter. First, a plurality of substrate shutter pulses φ SUB (substrate shutter voltage pulses in the figure) are applied to the substrate bias Vsub. The substrate shutter is for sweeping all the signal charge of the photodiodes 11 out to the substrate 17 by eliminating the effect of the overflow barrier (refer to FIG. 2) in response that the φ SUB makes the substrate bias Vsub higher. The completion of applying substrate pulses makes the storage amount of signal charge of photodiodes 11 "0". The period starting from the time of the completion of applying these substrate shutter pulses to the time of the closure of the mechanical shutter is the exposure period. Subsequently, the following periods are set in sequence: a high-speed sweeping period for previously sweeping out signal charge in the vertical CCDs 13, the first field output period, a high-speed sweeping period, the second field output period and an invalid data output period. In the respective heads of the readout periods of the first field and the second field, the readout pulse XSG that is superimposed on φV1 and φV3 reads out signal charge in the first field and the second field from the photodiodes 11 and applies them to the vertical CCDs. Through the invalid data output period that succeeds the second field output period, the second cycle starts from the monitor output period.

The first bias voltage is applied to the substrate bias Vsub in the high-speed moving picture mode (that is, during the monitoring period). As shown in FIG. 3, the first bias voltage is switched to the second bias voltage in the still picture mode (that is called a substrate bias modulation). The second bias voltage is lower than the first bias voltage, which makes the height of the overflow barrier (OFB) taller in the case of using the second bias voltage and brings the increase in saturation signal charge Qs. The second bias voltage is used in the period starting from the exposure period to the invalid data output period in the figure, at least the second field output period should be included.

The patent literature 1 discloses the modulation of the substrate bias and its timing more specifically.

[Patent literature 1] Japanese Laid-Open Patent application No. 1998-150183.

[Non-patent literature 1] Specification No. ICX232BQ "Diagonal 5 mm (Type 1/3.6) Frame Readout CCD Image Sensor with Square Pixel for Color Cameras" published by SONY Co.,

[online] Internet <URL: http://www.sony.co.jp/semicon/Japanese/img/sonyj01/e6801383.pdf> (search result as of Apr. 23, 2003)

However, in the case where the substrate bias is modulated before the exposure finishes, while the conventional technique makes it possible to estimate the decrement of saturation signal charge Qs that occurred at the time period when light is cut off by the mechanical shutter and compensate the decrement, there is a need to make the height of the overflow barrier (OFB) by the second bias voltage lower than that of the readout gate barrier in order to avoid blooming during all the periods. Thus, the amount of the bias modulation is limited. Therefore, there is no possibility that the amount of saturation signal charge Qs increases a lot.

Also, modulating the substrate bias after exposure makes the overflow barrier (OFG) at readout time higher than the one at charge storage time, which makes it possible to narrow the difference between the amount of saturation charge Qs in the first field and the one in the second field. However, no increase in the amount of saturation signal charge Qs is observed because the overflow barrier (OFG) at charge storage time is not made higher.

The conventional technique only avoids the deterioration in properties that is caused by the decrease in the amount of saturation signal charge in proportion to the elapsed time. As the recent refinement of the solid state image sensing apparatus resulted in the refinement of the surface of a photodiode, the surface of a gate electrode and the like, there emerges a need to improve the conversion quantum efficiency of a photocathode and to enhance the sensitivity as well as enlarge the capacity of the amount of saturation signal charge.

BRIEF SUMMARY OF THE INVENTION

An object of the present invention is to provide a solid state image sensing apparatus with enhanced sensitivity realized by improving linear characteristic of photodiode and its driving method.

In order to solve the above-mentioned problems, the solid state image sensing apparatus of the present invention comprises a solid state image sensing apparatus having an overflow drain structure for discharging the excessive charge that occurs in a photodiode into a drain and an electronic shutter function for discharging all the charge that is stored in the photodiode into the drain. The solid state image sensing apparatus is for transferring signal charge from vertical CCDs and a horizontal CCD that read out signal charge of photodiodes via a readout gate unit. The apparatus also includes a shielding unit operable to control incoming lights on the solid state image sensor and a driver unit operable to modulate bias voltage for setting a height of an overflow barrier in the overflow drain structure. As modulations of the bias voltage, the driver unit performs a first bias modulation for making a height of the overflow barrier higher before an end of an exposure period that finishes when a shielding unit of an electronic shutter closes, and a second bias modulation for making the height of the overflow barrier lower during a time period after the end of the exposure period and before a start of sweeping out charge on the vertical CCDs.

In the second bias modulation, the height of the overflow barrier may be temporally made lower before being made higher.

Also, it is possible to make the height of the overflow barrier higher by shifting to the second bias voltage which is lower than the first bias voltage in the first bias modulation and shifting to a third bias voltage, which is higher than the second bias voltage, for making the height of the overflow barrier lower than the height of the barrier in the reading out gate unit.

With this structure, it is possible to store signal charge up to the height of the reading out gate barrier by the first bias modulation and discharge excessive signal charge that is nearly reaching a top of the reading out gate by the second bias modulation, which makes it possible to prevent blooming from occurring and enlarge a linear range of photodiodes.

It is also possible to enhance the sensitivity by improving the conversion quantum efficiency of a photocathode during the exposure period. Especially, the longer the wavelength of the incoming light becomes, the higher the sensitivity becomes.

Here, the structure may be the one for performing the first bias modulation immediately after the end of discharge by the substrate shutter.

Also, the driver unit may be the one for making the height of the overflow barrier higher by shifting from the first bias voltage to the second bias voltage which is lower than the first bias voltage in the first bias modulation and then shifting from the second bias voltage to the third bias voltage which is higher than the second bias voltage in the second bias modulation. The first bias voltage may be the voltage for making the height of the overflow barrier lower than that of the reading out gate barrier, the second bias voltage may be the voltage for making the height of the overflow barrier higher than that of the reading out gate barrier, and the third bias voltage may be the voltage for making the height of the overflow barrier lower than that of the reading out gate barrier.

Also, the driver unit may be the structure for making the height of the overflow barrier higher by shifting from the first bias voltage to the second bias voltage which is lower in the first bias modulation and making the height of the overflow barrier lower temporally by superimposing control pulses on the second bias voltage in the second bias modulation.

Here, high-level voltage of the control pulse may be equal to the first bias voltage.

With this structure, the structure of the driver unit may be a simpler one that just generates a timing signal for applying the above-mentioned pulse without altering the structure of the conventional driver unit.

Also, high-level voltage of the control pulse may be higher than the first bias voltage.

With this structure, the height of the overflow barrier becomes temporally lower at the time of receiving the control pulse than it is at the time of applying the first bias voltage, which makes it possible to shorten the time for discharging excessive signal charge by the second bias modulation until its amount decreases to the desired value (a pulse width). Thus, the solid state image sensing apparatus is suitable for speeding up.

Also, high-level voltage of the control pulse may be lower than the first bias voltage.

With this structure, at the time of receiving the control pulse, the height of the overflow barrier is temporally lowered to the position that is higher than it is at the time of applying the first bias voltage, which makes it possible to lengthen the time for discharging excessive signal charge by the second bias modulation until its amount decreases to the desired value (a pulse width), and thus its amount is sure to reach the desired value accurately as time passes.

Also, the method for driving the solid state image sensing apparatus in the present invention comprises the steps corresponding to respective units and has the same actions respectively.

Up to this point, the solid state image sensing apparatus of the present invention can enhance the sensitivity by enlarging the linear property of photodiodes. Also, it becomes possible to prevent blooming from occurring and enlarge the linear range of the photodiodes 11.

Also, it becomes possible to enhance the sensitivity by improving the conversion quantum efficiency of a photocathode in the exposure period. Especially, the longer the wavelength of the incoming light becomes, the higher the sensitivity becomes.

Japanese Patent application No. 2003-124469 filed on Apr. 28, 2003, is incorporated herein by reference.

BRIEF DESCRIPTION OF THE DRAWINGS

These and other subjects, advantages and features of the invention will become apparent from the following description thereof taken in conjunction with the accompanying drawings that illustrate a specific embodiment of the invention. In the Drawings.

DESCRIPTION OF THE PREFERRED EMBODIMENTS

Figure 7:
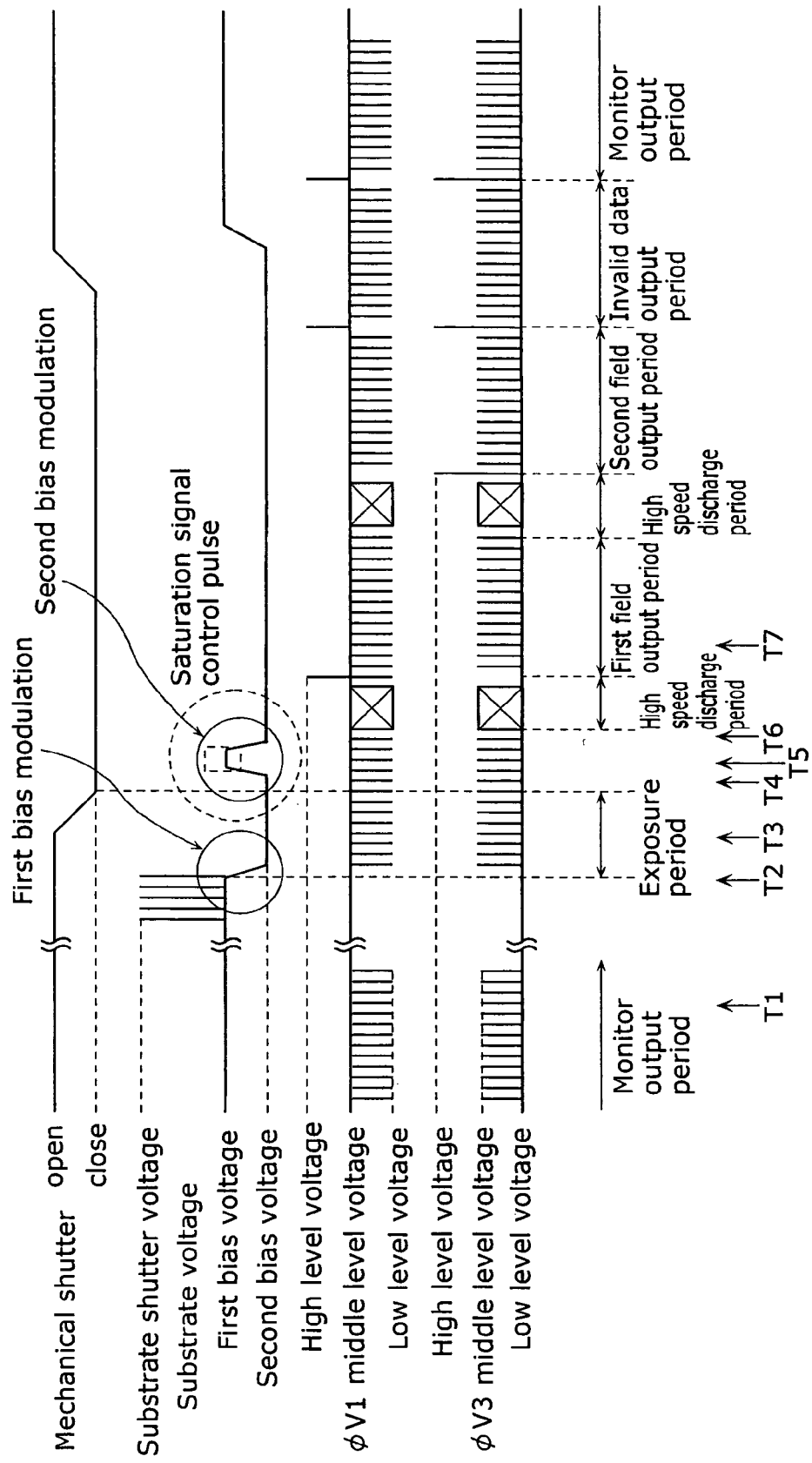
FIG. 7 is a time chart showing the operational timing of the solid state image sensing apparatus in reading out frames as well as performing a substrate bias Vsub modulation.

The solid state image sensing apparatus in a first embodiment of the present invention is characteristic in that it intentionally makes the height of the overflow barrier (OFB) higher than the readout gate barrier (refer to FIG. 12A) at the starting time of the exposure period (refer to T3 and T4 in FIG. 7) and in that it temporally lowers the height of the overflow barrier (OFB) so as to sweep out excessive charge on the substrate (refer to FIGS. 13 and 14) during the time period from the end of the exposure period to the start of sweeping out the vertical CCDs (refer to T5 in FIG. 7). In this way, it improves the linear property in photodiodes and enhances the sensitivity.

Figure 4:
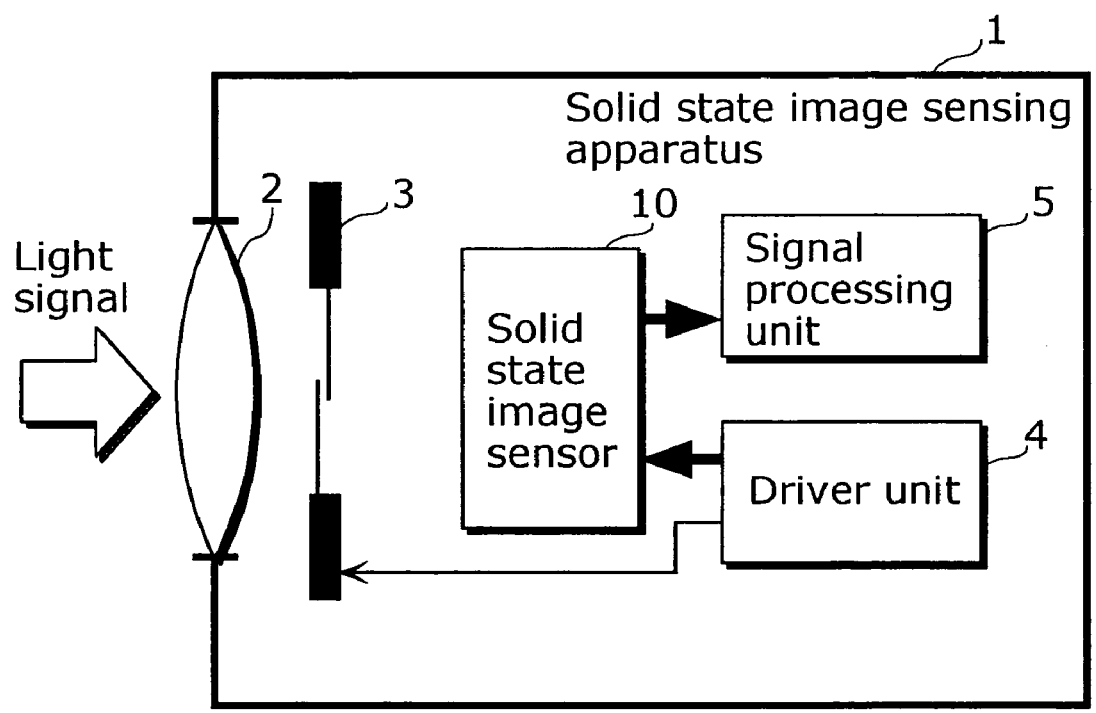
FIG. 4 is a block diagram showing the outline structure of the solid state image sensing apparatus in the embodiments.

FIG. 4 is a block diagram showing the outline structure of the solid state image sensing apparatus 1 in the first embodiment of the present invention. The solid state image sensing apparatus 1 comprises a lens 2, a mechanical shutter 3, a driver unit 4, a signal processing unit 5 and a solid state image sensor 10.

In the figure, the incoming light from the object (not shown in any figure) reaches the image pickup area of the CCD solid state image sensor 10 via its optical system such as the lens 2 and its mechanical shutter 3.

The mechanical shutter 3 controls incoming light in the image pickup area of the CCD solid state image sensor 10. Note that it is possible to include a liquid crystal shutter or the like that has a function for cutting off light instead of the mechanical shutter 3.

Figure 1:
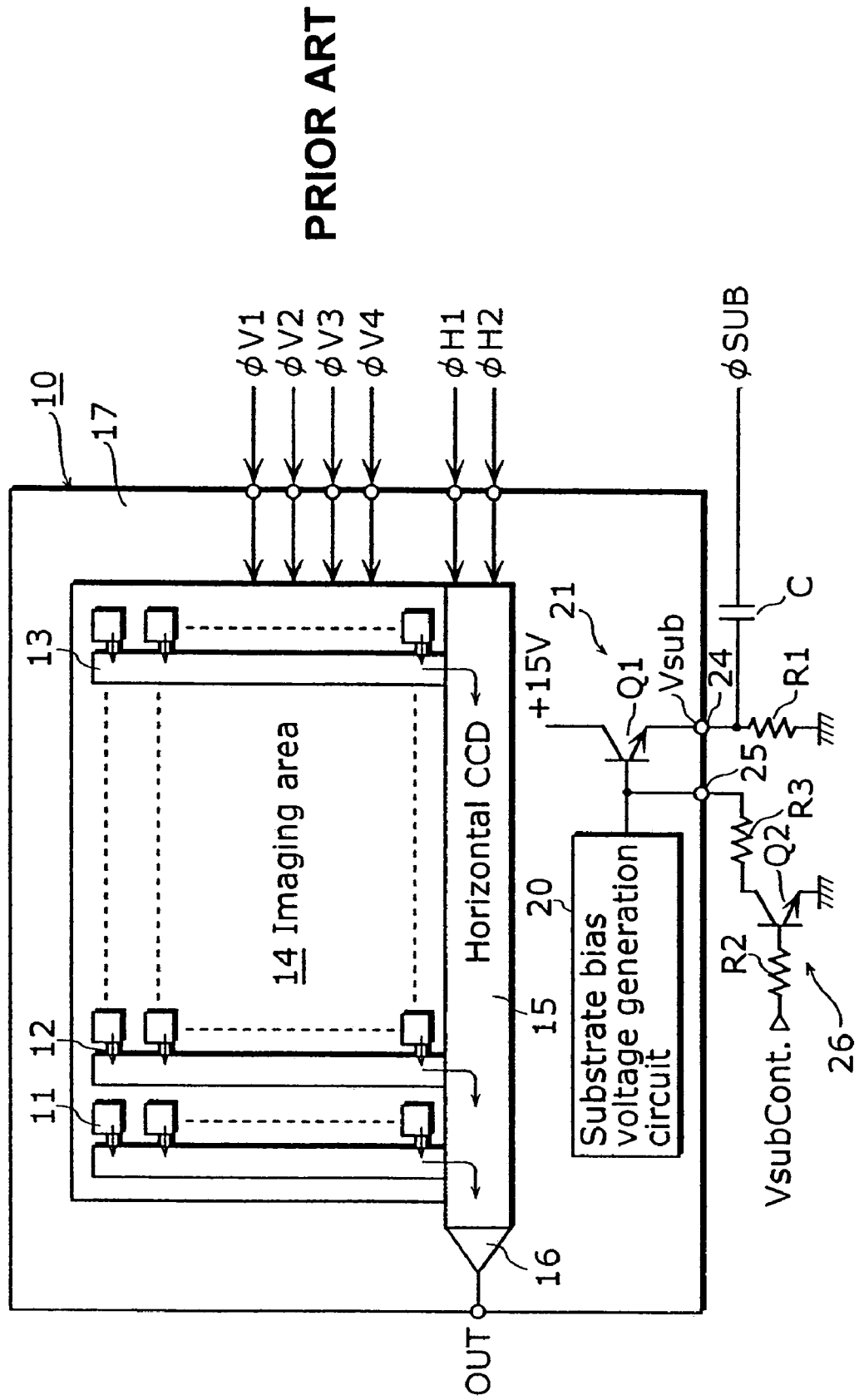
FIG. 1 is a block diagram showing the structure of the CCD solid state image sensor in the conventional technique.
Figure 2:
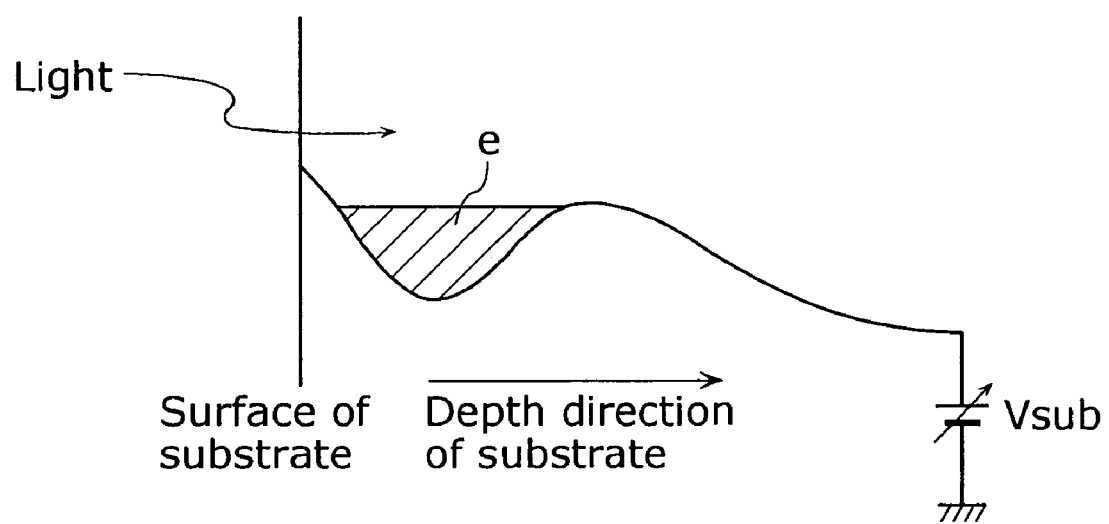
FIG. 2 is a diagram showing the distribution of potential in the depth direction of the substrate of photodiodes.
Figure 5A:
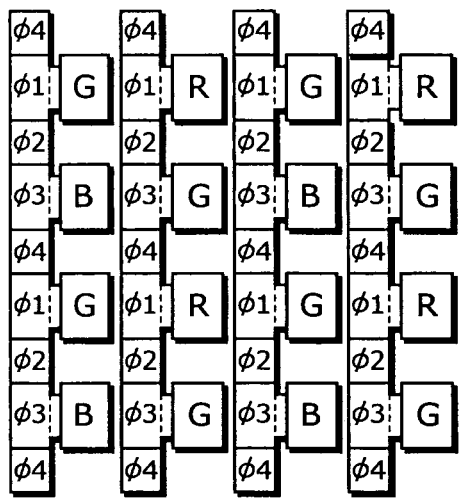
FIG. 5A is an example showing the array of the photodiodes in the solid state image sensor and the array of transmission electrodes of vertical CCDs.
Figure 5B:
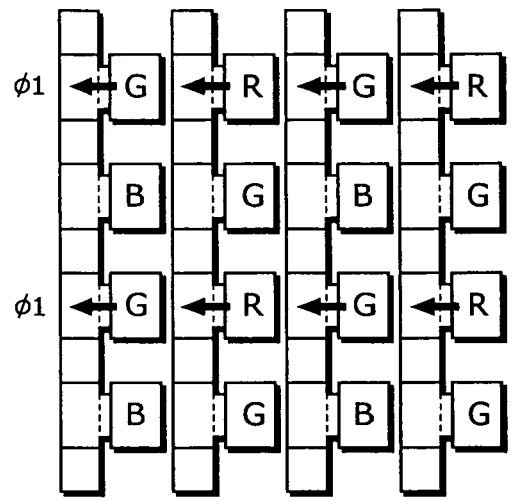
FIG. 5B is an illustration for reading out the first field of odd lines.
Figure 5C:
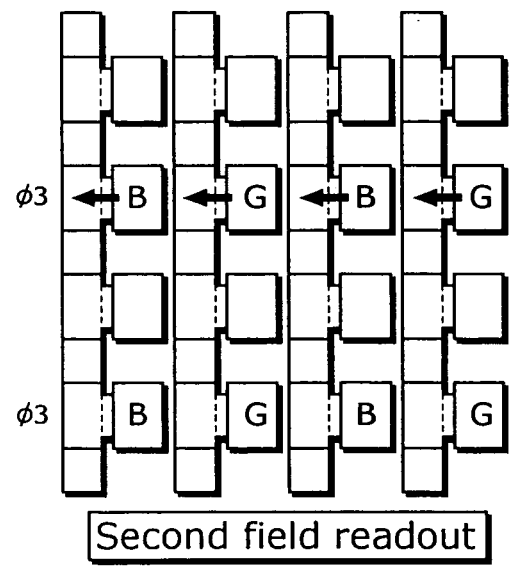
FIG. 5C is an illustration for reading out the second field of even lines.

The solid state image sensor 10 is the same as the solid state image sensor shown in FIG. 1. FIG. 5A is an example showing the array of the photodiodes in the solid state image sensor 10 and the array of the vertical transmission electrodes of the vertical CCDs 13. The array of photodiodes is so-called a Bayer pattern array. As the vertical transmission electrodes of the vertical CCDs 13, four kinds of electrode $\phi1$ to $\phi4$ that correspond to the four-phase pulse $\phi V1$ to $\phi V4$ respectively are arrayed in a repetitive manner. In this case, $\phi1$ and $\phi3$ also serve as readout gate electrodes for reading out signal charge from photodiodes in the odd lines and the even lines, to the vertical CCDs, respectively. Frames in the still picture imaging mode are read out after the exposure period in the following order. First, the first field comprising odd lines that are read out from the reading out gate electrodes $\phi1$ is read out as shown in FIG. 5B. Next, the second field comprising even lines that are read out from the reading out gate electrodes $\phi3$ is read out as shown in FIG. 5C.

The driver unit 4 generates a four-phase clock pulse $\phi V1$ to $\phi V4$ that controls the transmission of the vertical CCDs of the solid state image sensor 10, a two-layer clock pulse $\phi H1$ and $\phi H2$ that control the transmission of the horizontal CCD, the substrate bias voltage control signal VsubCont and the substrate shutter pulse $\phi$sub and the like and supplies them to the solid state image sensor 10. Also, $\phi V1$ and $\phi V3$ in the four-phase clock pulse are the signals that may take three values: a low level value, a middle level value and a high level value. The high level pulse is the readout pulse XSG that is applied on the readout gate electrode. This driver unit 4 performs a substrate bias modulation so as to lower the substrate bias voltage by shifting from the first bias voltage to the second bias voltage at the starting time of the exposure period in the still picture imaging mode and return to the first bias voltage after completing reading out the second field.

Figure 8A:
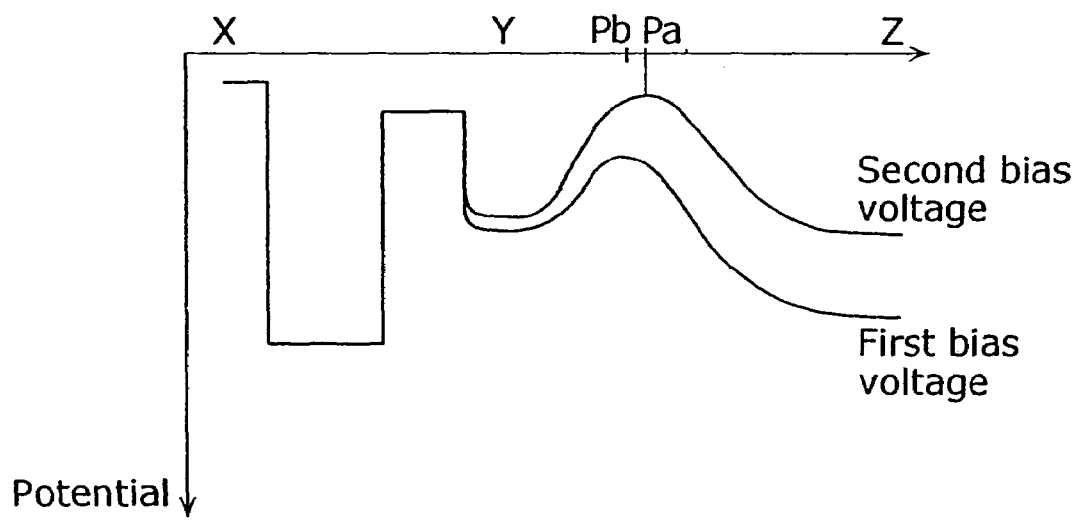
FIG. 8A is a diagram showing the distribution of potential at the time of applying the first bias voltage and the second bias voltage in the present invention.
Figure 8B:
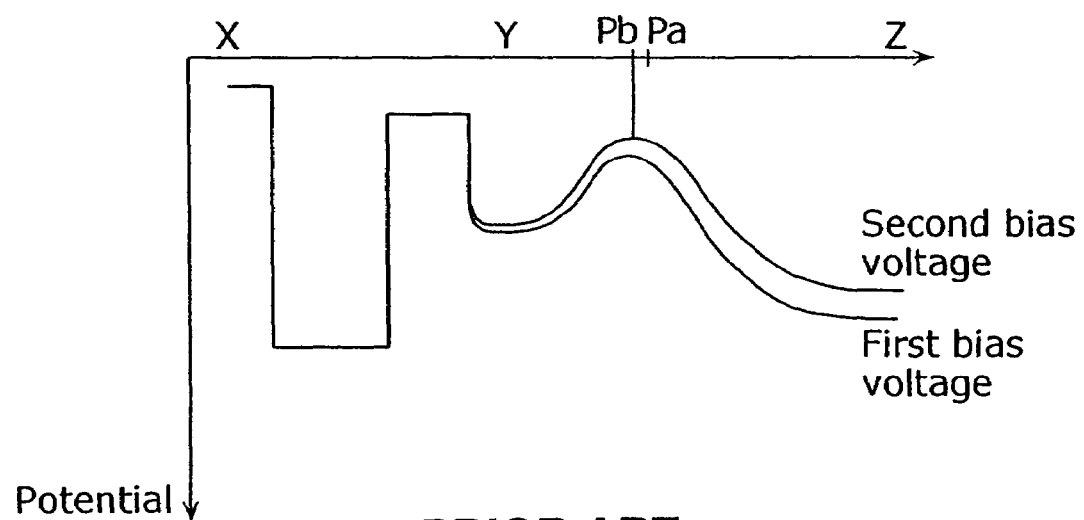
FIG. 8B is a diagram showing the distribution of potential at the time of applying the first bias voltage and the second bias voltage in the conventional technique.

Here, the first bias voltage is the substrate bias voltage in the moving picture imaging mode with the mechanical shutter 3 opened. The second bias voltage is lower than the first bias voltage and is the substrate bias voltage for increasing the amount of saturation signal charge Qs by raising the height of the overflow barrier. The height of the overflow barrier (OFG) by the second bias voltage is set in a form that it becomes higher than the height of reading out gate barrier. FIG. 8A shows the distribution of potential of the overflow barrier by the first bias voltage and the second bias voltage. The X and Y of the horizontal axis shows the substrate horizontal direction from the vertical CCDs 13 to the photodiodes 11 shown in FIG. 6 and the substrate depth direction of the photodiodes 11 shown in FIG. 6. The vertical axis shows potential. As a comparable example, FIG. 8B shows the distribution of potential of the overflow barrier by the first bias voltage and the second bias voltage in the conventional technique. As shown in FIG. 8A, making the height of the overflow barrier (OFB) higher than the height of the reading out gate 12 increases the amount of saturation signal charge Qs and enlarges the linear area up to the saturation area (that may also be called knee area). Comparing the peak Pa of the overflow barrier in FIG. 8A with the peak Pb of the overflow barrier in FIG. 8B, the location of Pa in the first embodiment is deeper than that of Pb in the conventional technique. This means that the area capable of gathering and storing signal charge that is generated by the conversion quantum efficiency of a photocathode is enlarged and the amount of saturation signal charge Qs increases. Thus, it becomes possible to improve the conversion quantum efficiency of a photocathode and enhance the sensitivity.

In contrast, the height of the overflow barrier (OFB) by the second bias voltage in the conventional technique is set at the position that is lower than the height of the reading out gate barrier 12 as shown in FIG. 8B. This is for avoiding blooming, in other words, preventing the signal charge from spilling over into the vertical CCDs 13 side.

In FIG. 8A, excessive signal charge is spilt over into the vertical CCDs 13 side during the exposure period as the reading out gate barrier 12 is lower than the barrier of the overflow barrier (OFG), but this does not affect the picture quality because the spilt over signal charge is swept out in high-speed sweeping of the vertical CCDs 13 before the signal charge of the photodiodes 11 are read out. Also, the height of the overflow barrier is temporally lowered so as to discharge excessive charge to the substrate 17 by applying a control pulse for controlling the saturation signal amount during the period from the end of the exposure period to the start of high-speed sweeping out.

Also, the substrate bias voltage, after applying a pulse, can eliminate a height difference between the first field and the second field by setting the voltage at a value that can prevent signal charge from being emitted to the substrate by thermal excitation.

The signal processing unit 5 performs various kinds of signal processing such as automatic white balance adjustment on the output signals from the solid state image sensor 10 and outputs them outside as imaging signals.

Figure 6:
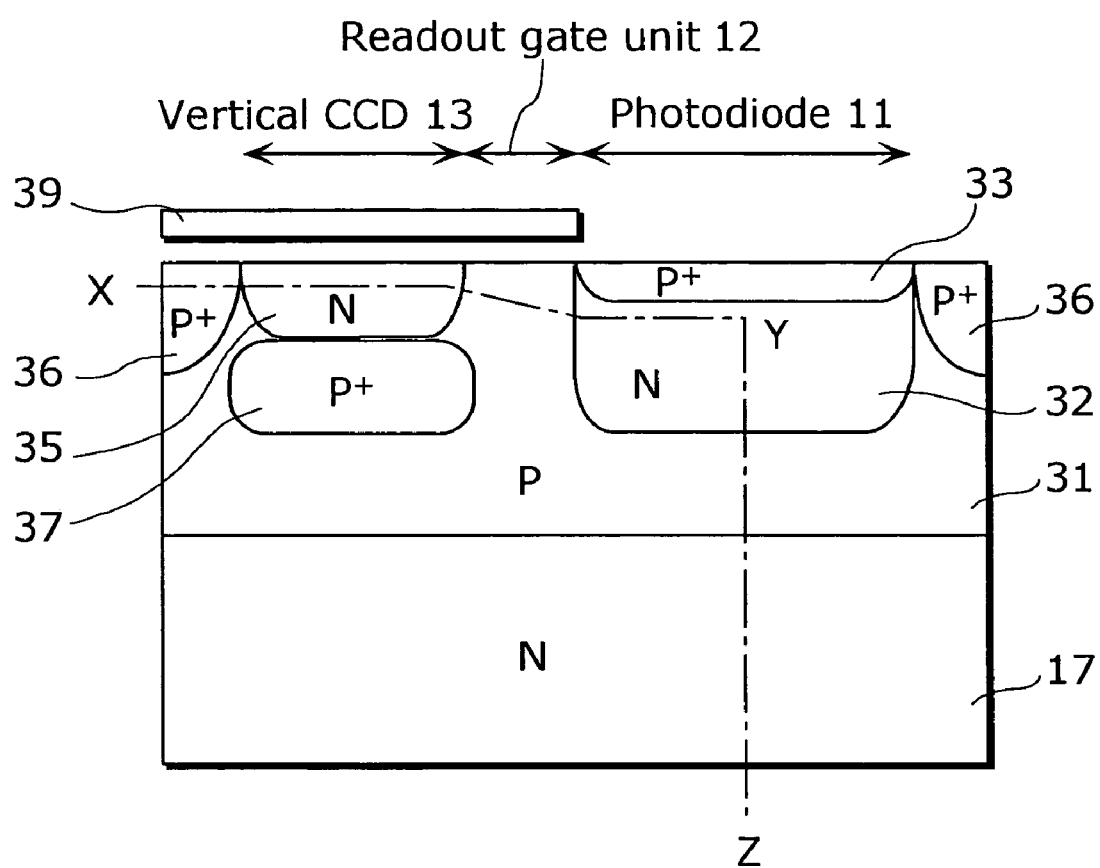
FIG. 6 is a section view of the solid state image sensing apparatus for showing its structure in the depth direction of the substrate around photodiodes and the vertical CCDs.

FIG. 6 is a section view of the solid state image sensing apparatus for showing its structure in the depth direction of the substrate around photodiodes 11 and the vertical CCDs 13. In FIG. 6, for example, a P-type well area 31 is formed on the surface of a N-type substrate 17. A N-type signal charge storage area 32 is formed on the surface of the well area 31 and a P+-type hole storage area 33 is formed on the N-type signal charge storage area 32 to make the photodiode 11.

The amount of charge of the signal charge "e" that is stored in the photodiodes 11 is determined by the height of potential in the overflow barrier (OFB) that is formed in the P-type well area 31. This overflow barrier (OFB) is for determining the amount of saturation signal charge that is stored in the photodiodes 11, and in the case where the amount of stored charge exceeds the amount of saturation signal charge Qs, the excessive potential is swept to the substrate 17 side over the potential barrier.

In this way, the photodiodes 11 with a so-called vertical overflow drain structure is formed.

In the horizontal direction of the photodiodes 11, a N-type signal charge transmission area 35 and a P+-type channel stopper area 36 are formed via the part that forms the readout gate unit 12 in the P-type area 31. Underneath the signal charge transmission area 35, a P+-type impurities dispersing area 37 for preventing smear ingredient from being mixed is formed. Further, above the signal charge transmission area 35, a transmission electrode 39 that comprises, for example, polysilicons is used to make the vertical CCDs 13. The part of the transmission electrode 39 which is located above the P-type area 31 also serves as a gate electrode of the reading out gate unit 12.

To the substrate 17, the substrate bias Vsub is applied for determining the amount of signal charge that is stored in the photodiodes 11 (that is, for determining the amount of potential of the overflow barrier (OFB)).

FIG. 7 is a time chart showing the operational timing of the solid state image sensor 10 in reading out frames as well as performing a substrate bias Vsub modulation. FIG. 7 shows the open/close state of the mechanical shutter 3, the substrate bias Vsub (substrate voltage in the figure) and a vertical transmission clock φV1 and φV3 that are applied on the readout gate electrode 12 between the photodiodes 11 and the vertical CCDs 13. The high-level pulse that is superimposed on the vertical transmission clock φV1 and φV3 is a readout pulse XSG that is given to the readout gate electrode 12. Time T1 to T7 in the FIG. 7 will be explained below.

Figure 9:
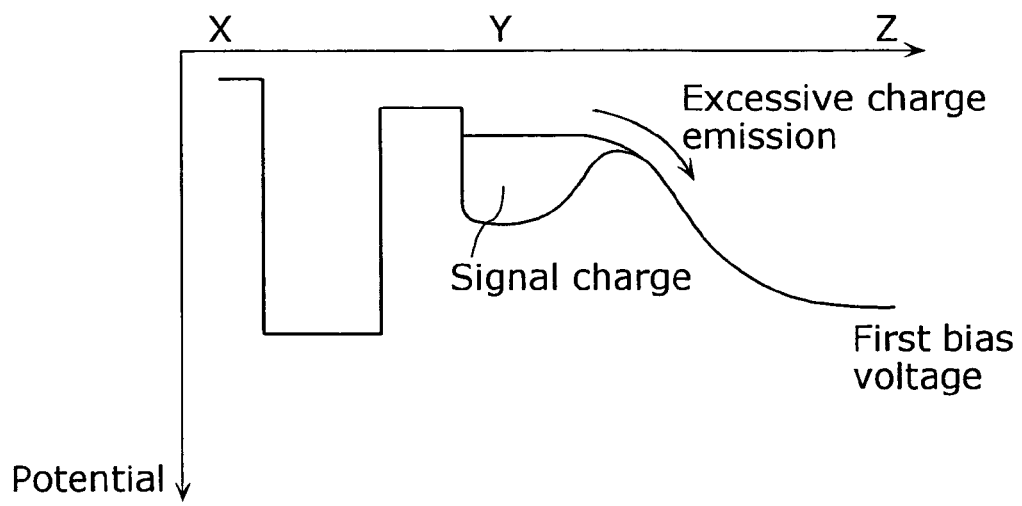
FIG. 9 is a diagram showing the distribution of potential at the time of applying the first bias voltage (time T1)

(time T1) with the mechanical shutter 3 opened in the monitor period (high-speed moving picture imaging mode), pictures are read out in succession from the solid state image sensor for displaying them on a view finder or a liquid crystal monitor and displayed as moving pictures. FIG. 9 is a diagram showing the distribution of potential in the high-speed moving picture imaging mode (time T1 in FIG. 7). As shown in FIG. 9, in the high-speed moving picture imaging mode, the overflow barrier (OFB) by the first bias voltage is set at the position that is lower than the readout gate barrier 12.

Figure 10:
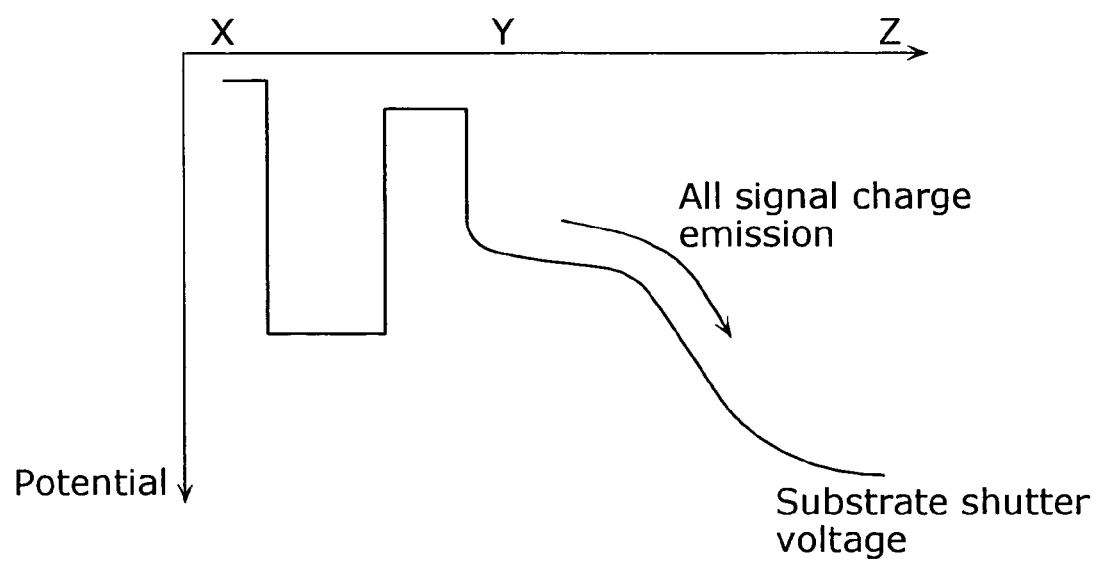
FIG. 10 is a diagram showing the distribution of potential at the time of applying the substrate shutter pulse (time T2)

(time T2) Also, in response that a user operates the shutter, imaging a still picture by reading out a frame starts (the mode is called still picture imaging mode) with a help of the mechanical shutter 3. In this still picture imaging mode, first, a plurality of substrate shutter pulses φ SUB are applied to the substrate bias Vsub. FIG. 10 is a diagram showing the distribution of potential at the time of applying the substrate shutter pulse φ SUB (time T2 in FIG. 7). As shown in FIG. 10, eliminating the overflow barrier by making the substrate bias Vsub higher at the time of applying the substrate shutter pulse results in sweeping out all the signal charge of the photodiodes 11 on the semiconductor substrate. In this way, all signal charge of photodiodes 11 is swept out at the time when a plurality of substrate shutter pulse φ SUB are applied.

Figure 11A:
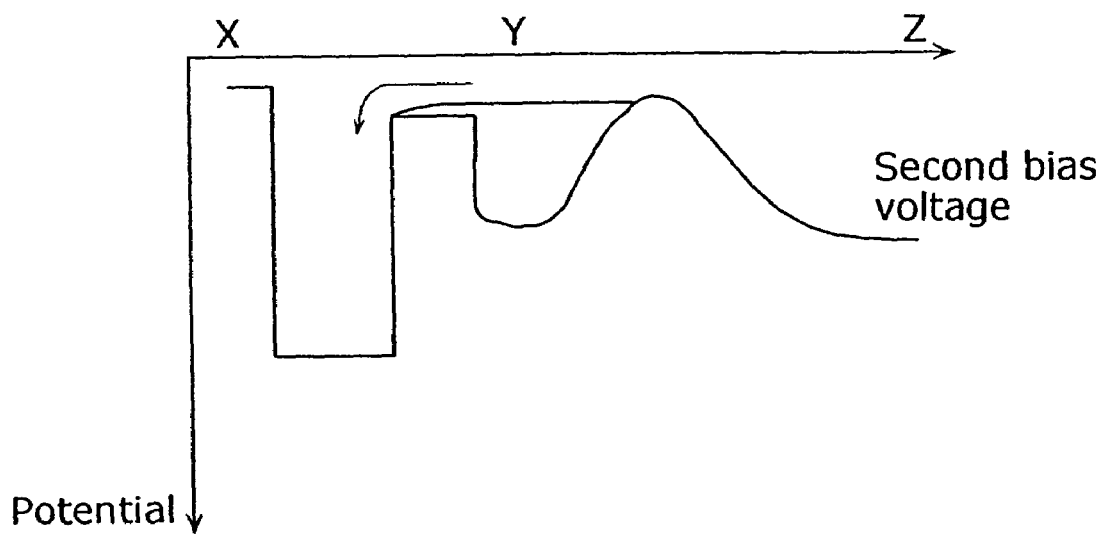
FIG. 11A is a diagram showing the distribution of potential at time T3 in this embodiment.

(time T3) Further, the driver unit 4 performs a bias modulation for lowering the substrate bias voltage Vsub from the first bias voltage to the second bias voltage immediately after the last substrate shutter pulse in a plurality of substrate shutter pulses is applied. The completion of applying the substrate shutter pulse triggers the start of the exposure period. FIG. 11A is a distribution of potential at the time when the second bias voltage is applied (time T3) in the exposure period. As shown in FIG. 11A, the amount of saturation signal charge Qs increases because the height of the overflow barrier (OFB) is higher than the readout gate barrier 12. The signal charge that is produced by the incoming light exceeding the amount of the saturation signal change Qs are to be spilt over into the vertical CCDs 13 side over the readout gate barrier 12, but this does not affect the picture quality because they are to be swept out when the following vertical CCDs 13 performs a high-speed sweeping out.

Figure 11B:
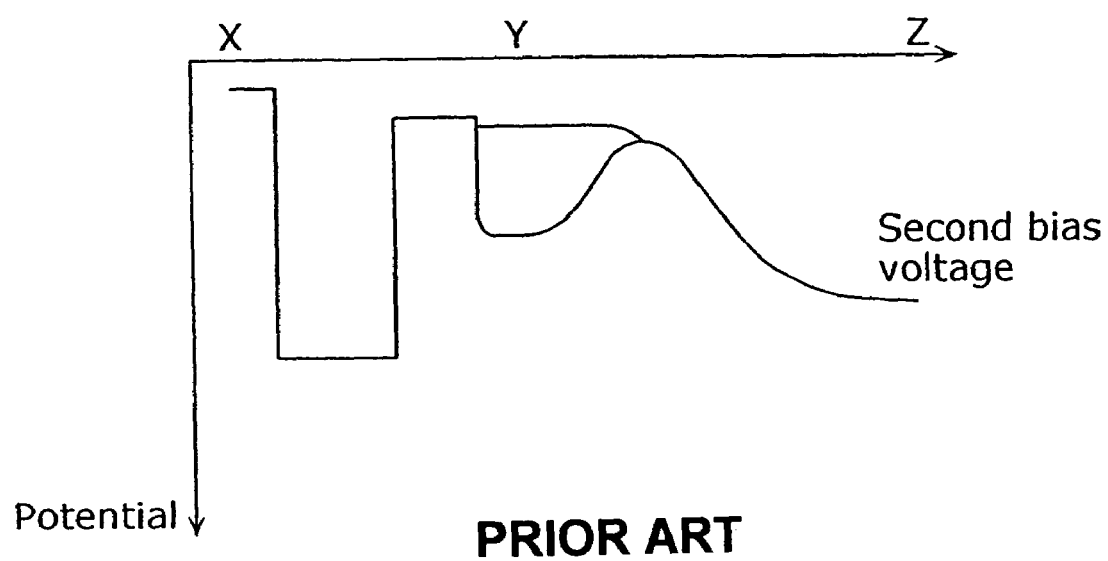
FIG. 11B is a diagram showing the distribution of potential at time T3 in the conventional technique.
Figure 16:
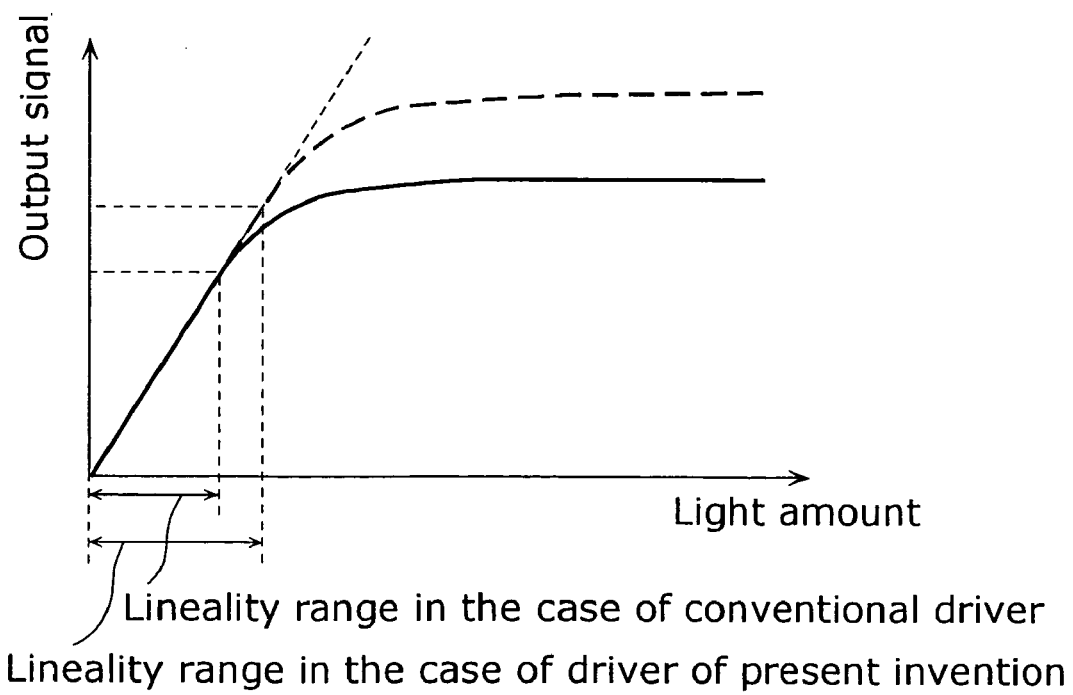
FIG. 16 is a graph showing a characteristic of the amount of incoming light of the photodiodes and an output signal property.

Also, in the distribution of potential in FIG. 11A, it is possible to enlarge the linear area as well as to increase saturation signal charge amount Qs. As a comparable example, FIG. 11B shows the distribution of potential at the time of using the second bias voltage in the conventional technique. FIG. 16 is a graph showing the characteristic of the amount of incoming light on the photodiodes 11 and the output signal property. The broken line in the figure shows the property in the first embodiment that is shown in FIG. 11A, and the solid line shows the property in the conventional technique that is shown in FIG. 11B. In FIG. 16, the graph part that is almost horizontal is the saturation area (knee area) and an output signal is bigger in the saturation area (shown in a form of a broken line) in the first embodiment than in the saturation area (shown in a form of a solid line) in the conventional technique (in other words, the amount of saturation signal charge Qs increases). Besides, a linear area with a sharp lean (the linearity range in the figure) also enlarges in the first embodiment.

Figure 18:
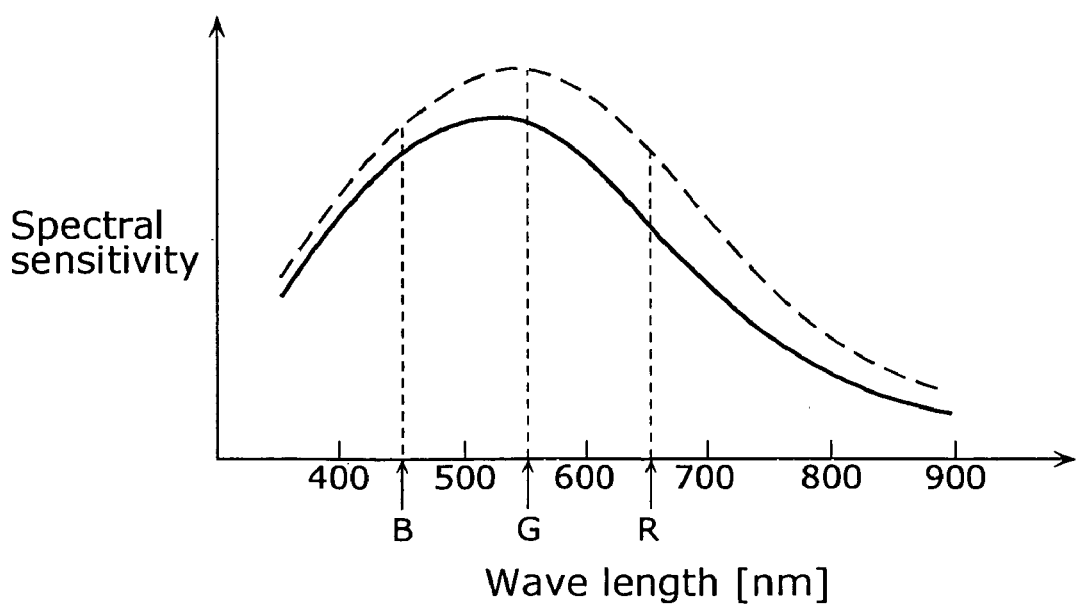
FIG. 18 is a graph showing a characteristic of the wavelength of the incoming light of photodiodes and (sensitivity) a spectral response.

Further, sensitivity is enhanced in the first embodiment. This is because the location of the peak of the overflow barrier is located further from the reading out gate 12 such that it enlarges the area capable of gathering and storing the signal charge that occurred by the conversion quantum efficiency of a photocathode, which improves the photocarrier generation efficiency. FIG. 18 is a graph showing the characteristic of the incoming light wavelength of the photodiodes 11 and the spectral sensitivity. The broken line in the figure shows the property in the first embodiment, and the solid line shows the property in the conventional technique. The longer the incoming light wavelength becomes, the higher the sensitivity becomes. This means the longer the incoming light wavelength becomes, the higher the sensitivity becomes. This is because the longer the wavelength becomes, the deeper in the depletion layer the light reaches. As shown in FIG. 18, when the color temperature is 3200K, the sensitivity of the red wave (R) is improved by about 10%, the sensitivity of the green wave (G) is improved by about 7% and the sensitivity of the blue wave (B) is improved by about 3%.

Figure 12A:
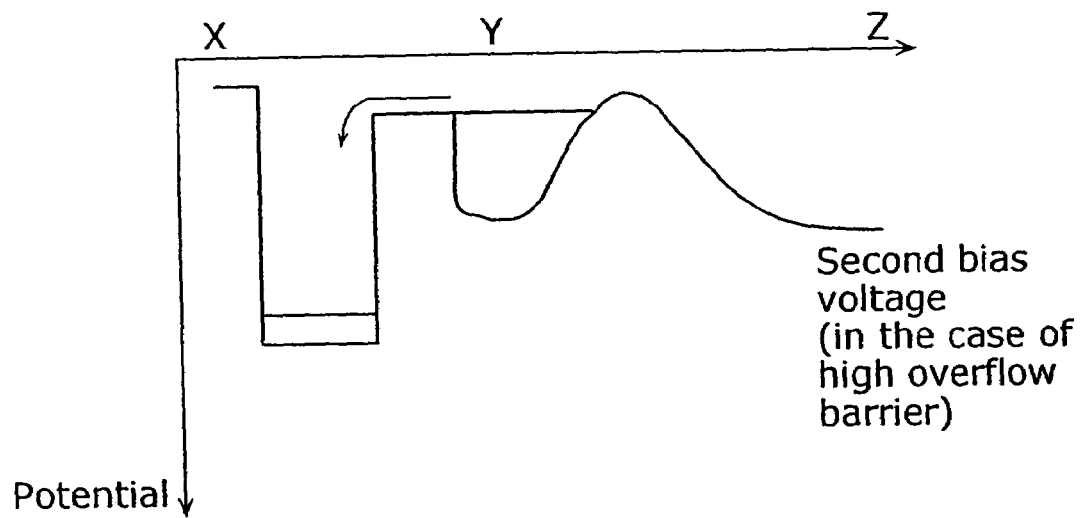
FIG. 12A is a diagram showing the distribution of potential at time T4 in this embodiment.
Figure 12B:
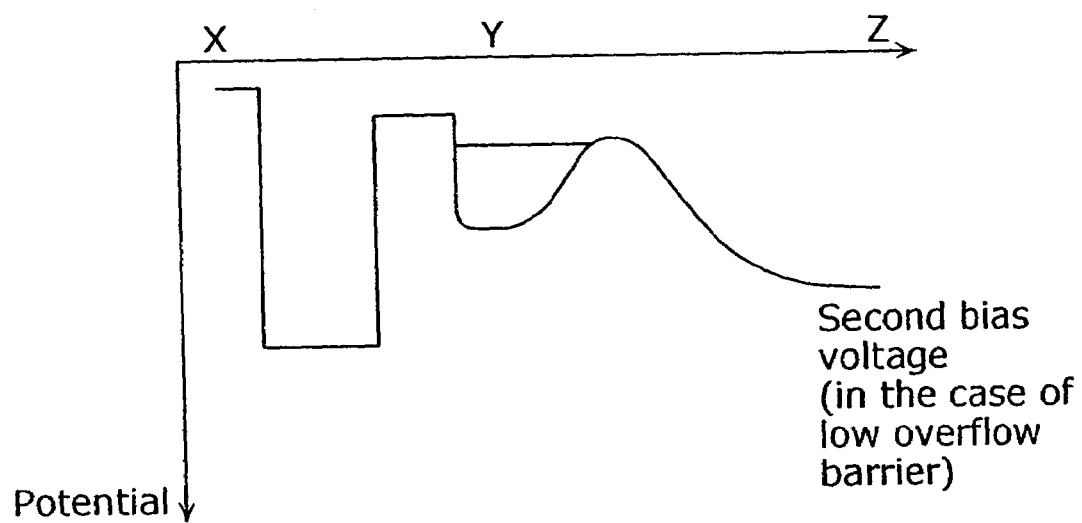
FIG. 12B is a diagram showing the distribution of potential at time T4 in the conventional technique.

(time T4) Further, closing the mechanical shutter 3 is the completion of the exposure period. FIG. 12A is a distribution map of potential at the time of closing the mechanical shutter 3 (time T3). As a comparable example, FIG. 12B shows a conventional distribution map of potential at the time of closing the mechanical shutter 3. While the height of the overflow barrier (OFB) determines the saturation signal charge amount Qs of the photodiodes 11 in the conventional technique as shown in FIG. 12B, the height of the gate electrode barrier determines the amount in the first embodiment as shown in FIG. 12A, the saturation signal amount Qs increased in this way enlarges the linear area.

Figure 13:
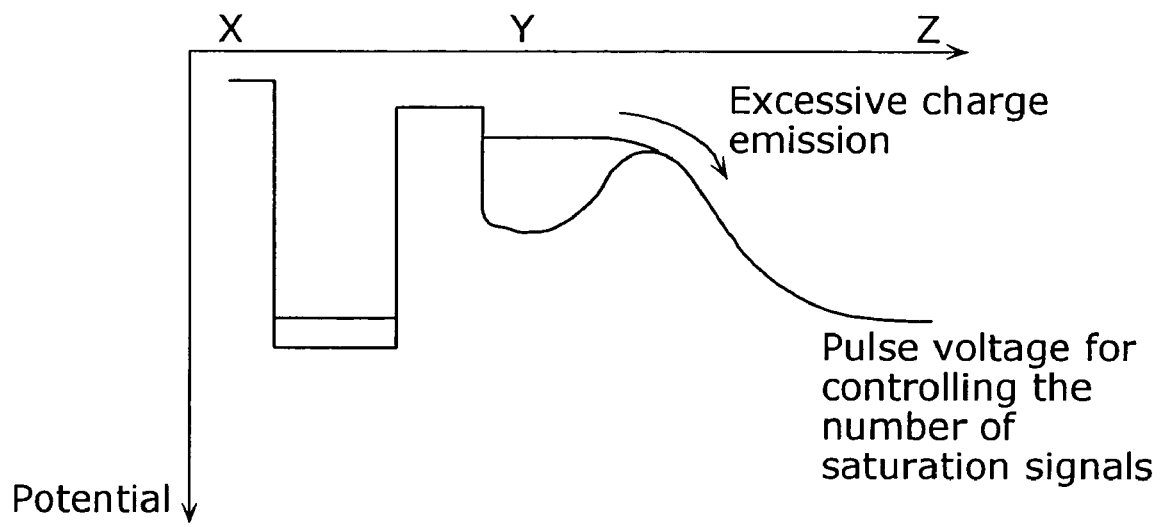
FIG. 13 is a diagram showing the distribution of potential at the time of applying a saturation signal control pulse (time T5)

(time T5) Blooming tends to occur in the case where signal charge is stored nearly up to the top of the readout gate electrode 12 shown in FIG. 12A. Therefore, the driver unit 4 applies a saturation signal control pulse for reducing the amount of saturation signal charge during a time period after the closure of the substrate shutter and before a start of sweeping out charge on the vertical CCDs 13. FIG. 13 is a diagram showing the distribution of potential at the time of the saturation signal control pulse is applied (time T5). As shown in FIG. 13, as the potential of the height of the overflow barrier is temporally lowered while applying the high-level period of the saturation signal control pulse, the excessive charge is discharged on the substrate 17 so as to prevent the saturation signal charge from exceeding the top of the readout gate electrode 12. In this way, it is possible to prevent blooming from occurring and enlarge the linear range of the photodiodes 11.

Figure 17:
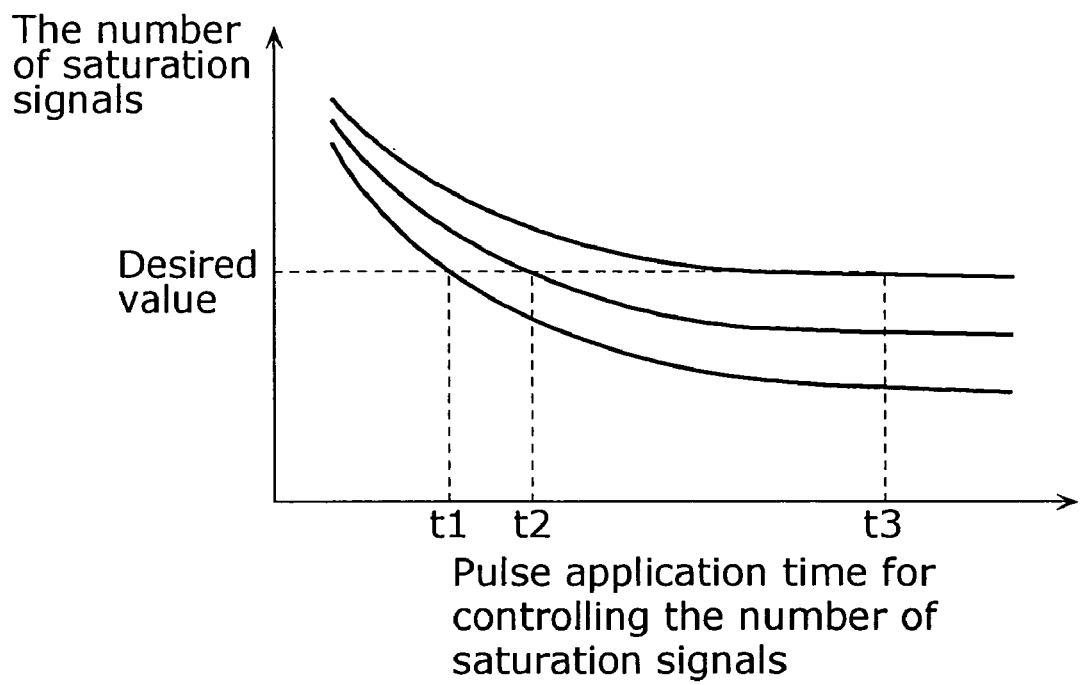
FIG. 17 is a diagram showing the relation between the time for applying the saturation signal control pulse and the storage amount of signal charge.

FIG. 17 is a diagram showing the relation between the application time of the saturation signal control pulse and the storage amount of signal charge. The horizontal axis in the figure shows the high-level application time of the saturation signal control pulse, and the vertical axis shows the maximum storage signal amount (saturation signal amount in the figure) after applying the saturation signal control pulse (high-level voltage). Three solid lines are aligned in ascending order of the peak values (high-level voltage) of these respective pulses. As shown in FIG. 18, in order to reduce the number of saturation signals to the desired value in the case of a low peak value, there is a negative effect in that it takes a longer time for applying the pulses, but there is a positive effect in that the number is to reach the desired value surely and stably. In contrast, in the case of a high peak value, there is a positive effect in that it takes a shorter time for applying the pulses, but there is a negative effect in that it is not sure whether the number is to reach the desired value stably. Also, setting the peak value at the same value as the first bias voltage makes it possible to generate saturation signal control pulses using the Vsub-Cont signal, which simplifies the control.

Figure 14:
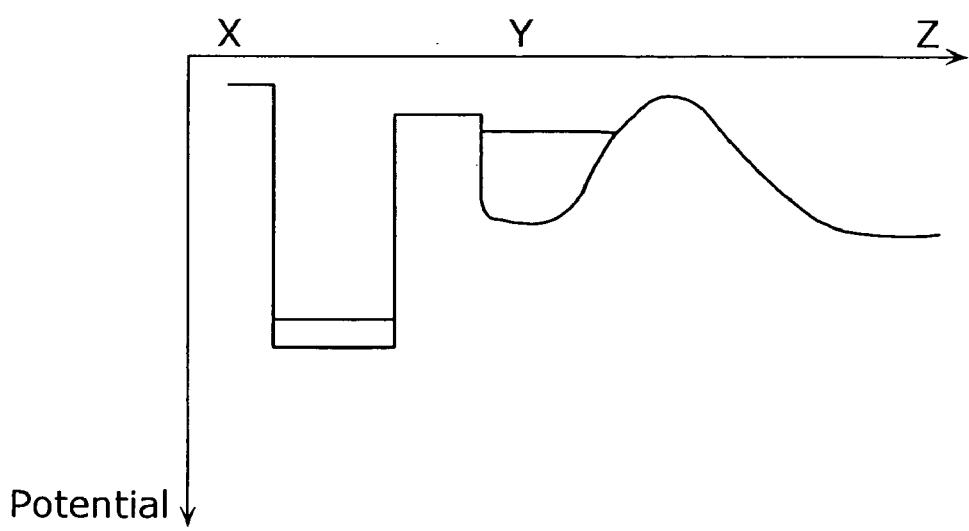
FIG. 14 is a diagram showing the distribution of potential at the time when applying a saturation signal control pulse finishes (time T6)

(time T6) FIG. 14 is a diagram showing the distribution of potential at the time of completing applying saturation signal control pulses (time T6). As shown in FIG. 14, the substrate bias voltage returns to the second bias voltage. The excessive charge remains that spilt over during the exposure period in the vertical CCDs 13. This excessive charge is transferred to be outputted during the high-speed sweeping out period that arrives immediately after the time T6. In other words, as transmission clock pulse φV1 to φV4 are applied in the vertical CCDs 13 in sequence at a fast cycle, the excessive signal charge that is spilt over on the vertical CCDs 13 during the exposure period is transferred to be outputted. The cycle of the vertical transmission clock pulse φV1 to φV4 is the cycle for sending a single line for every horizontal scanning period in the normal field output period, but the cycle becomes faster than it in the high-speed sweeping out period. It is also possible to sweep out this charge from a dummy field instead of this high-speed sweeping out period.

Figure 15:
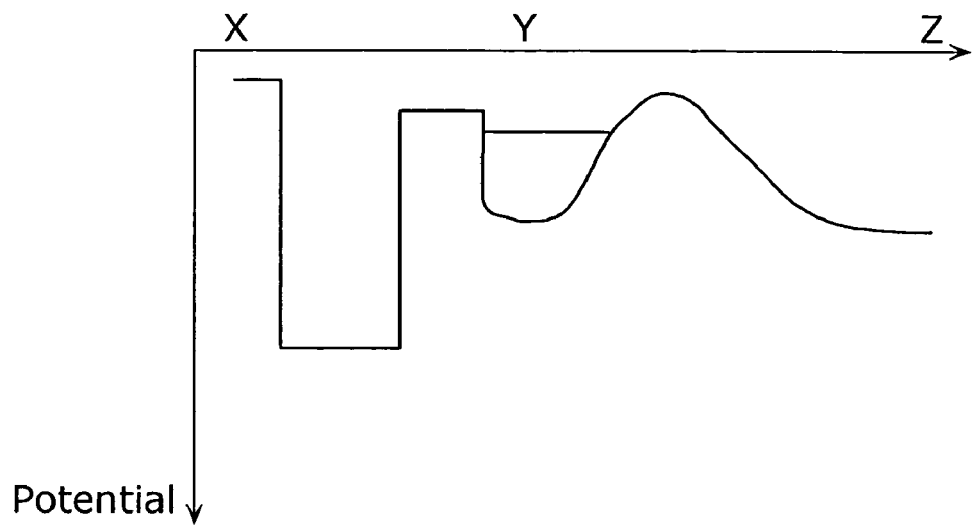
FIG. 15 is a diagram showing the distribution of potential at the time when the period of high-speed sweeping of the vertical CCDs completes (time T7)

(time T7) FIG. 15 is a diagram showing the distribution of potential of at the time when the high-speed sweeping out period of the vertical CCDs 13 completes (time T7). As shown in FIG. 15, no signal charge of the vertical CCDs 13 is left because they are transferred to be outputted by the high-speed sweeping out.

Figure 3:
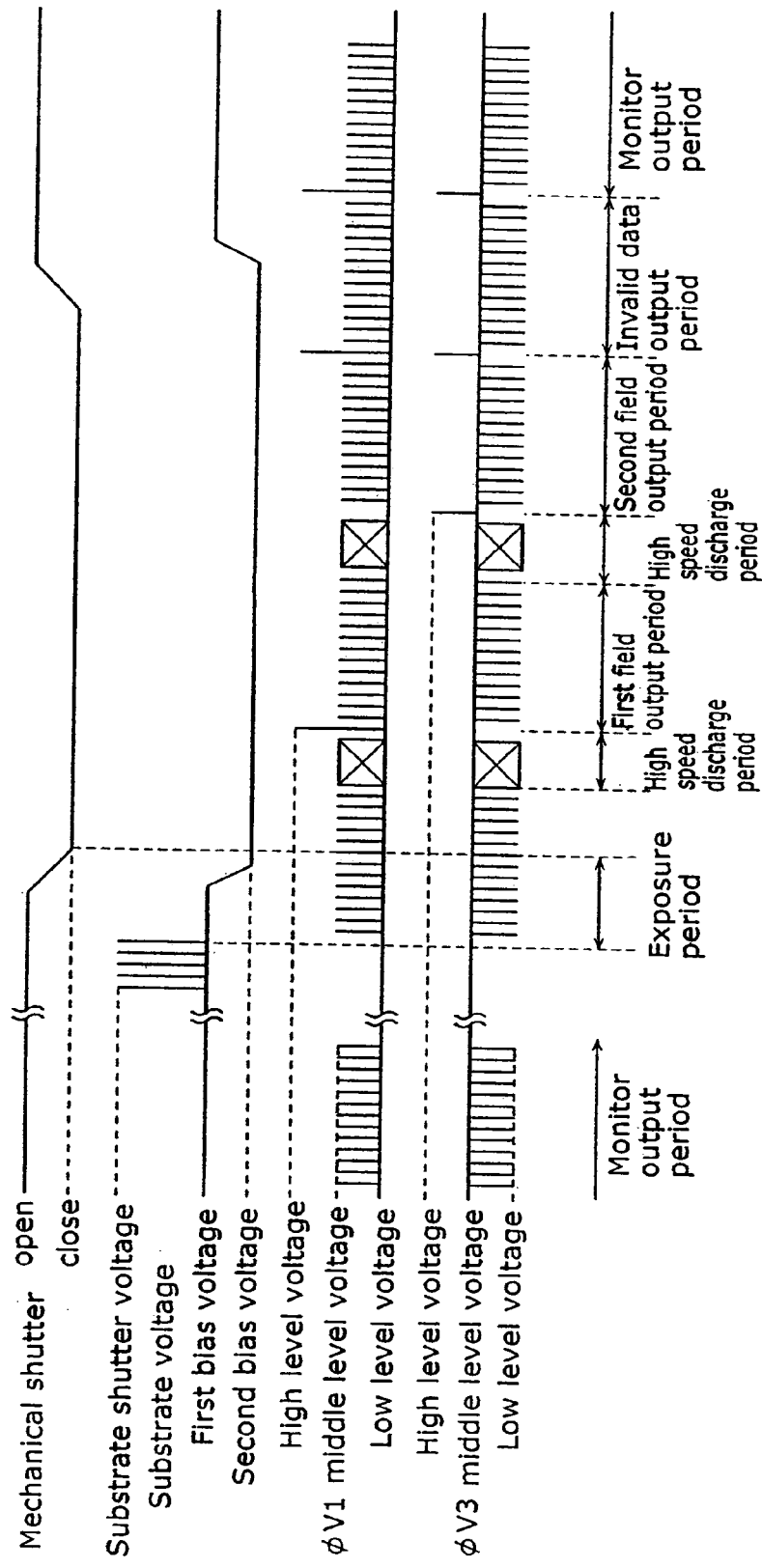
FIG. 3 is a time chart showing the operational timing of the solid state image sensing apparatus in the conventional technique.

Also, as the operational timing after the first field output period in FIG. 7 is almost the same as the one in FIG. 3, explanation on it will be omitted.

As has been explained up to this point, the solid state image sensing apparatus in the first embodiment sweeps out excessive charge on the substrate (refer to FIG. 13 and FIG. 14) by setting the height of the overflow barrier (OFB) at the time of starting the exposure period (refer to time T3 and T4 in FIG. 7) at the position that is higher than the height of the readout gate barrier 12 (refer to FIG. 12A) and then by temporally lowering the height of the overflow barrier (OFB) during the time period from the end of the exposure period to the start of sweeping out the vertical CCDs (refer to T5 in FIG. 7). In this way, it improves the linear property in photodiodes 11 and enhances the sensitivity.

The first embodiment has explained the structure with which i) the overflow barrier (OFB) is set at a position that is higher than the readout gate 12 at the starting time of the exposure period, in addition, ii) the overflow barrier (OFB) is temporally made lower than the barrier in the readout gate unit 12 during the time period from the end of the exposure period to the start of sweeping out the vertical CCDs and excessive charge is swept out on the substrate. Here, the second embodiment will explain the structure with which the variation of ii) the temporally lowered overflow barrier in ii) that succeeds i) is kept at the position without being lowered in a certain duration.

The solid state image sensing apparatus in this variation has the same structure as the solid state image sensing apparatus shown in FIGS. 3, 4 and 17, but the method for driving the substrate bias voltage in the driver unit 4 differs a little. The same points are omitted, and different points are focused on in the following explanation.

Figure 19:
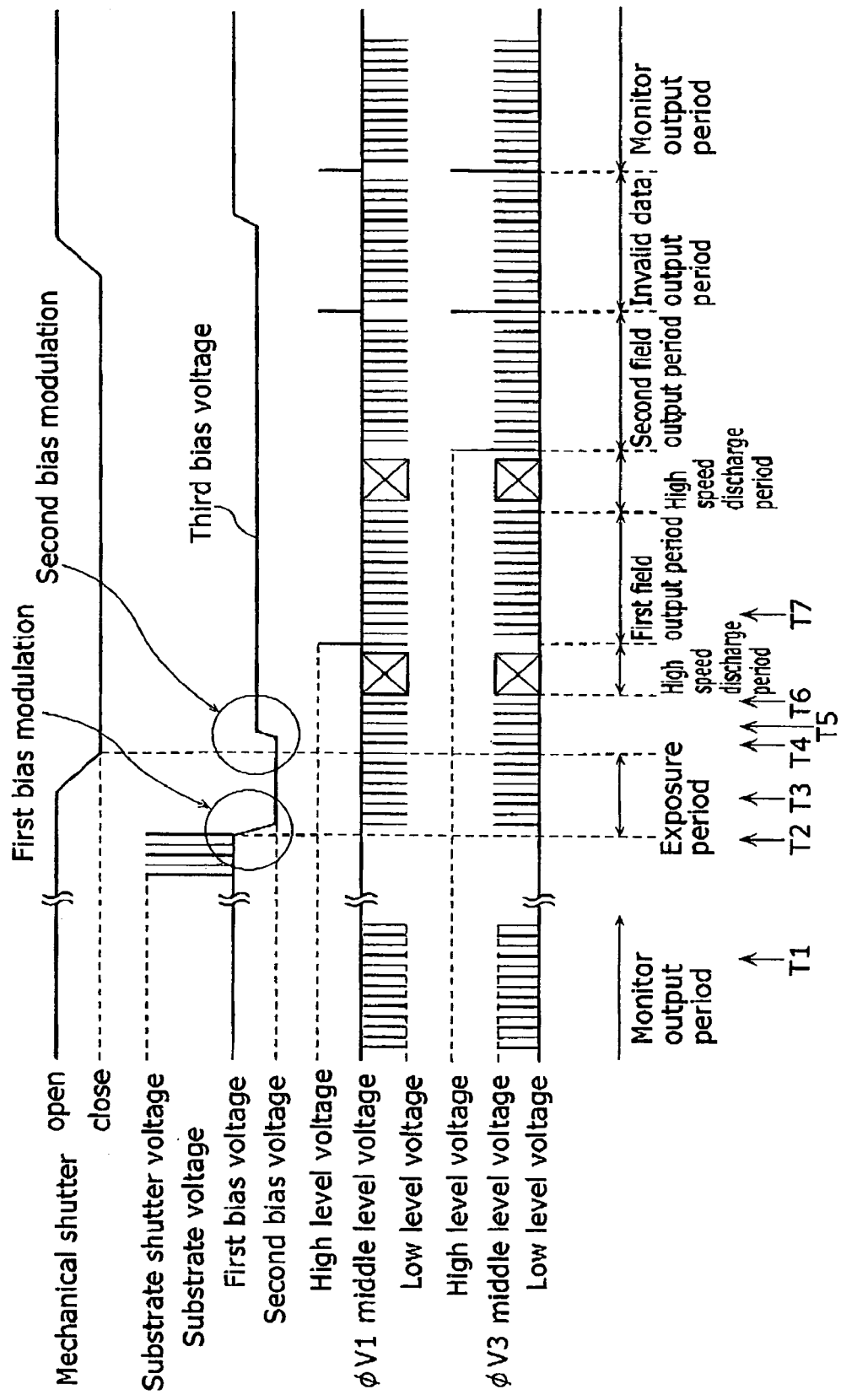
FIG. 19 is a time chart showing the operational timing of the solid state image sensing apparatus in the variation of this embodiment.

FIG. 19 is a diagram showing the operational timing of the solid state image sensing apparatus 1 in this variation. FIG. 19 differs from FIG. 7 in the driving method of the substrate bias voltage by the driver unit 4.

In other words, the driver unit 4 raises the substrate bias voltage from the second bias voltage to the third bias voltage at the same timing as the pulse, instead of applying control pulse for controlling saturation signal amounts. As shown in FIG. 19, the third bias voltage here may have any value as long as it is within the range from the first bias voltage to the second bias voltage because the value needs to make the height of the overflow barrier lower than that of the barrier in the readout gate unit 12.

In this way, it is possible to obtain the effect that the above-mentioned i) and variation of ii) can enlarge the linear property and improve the sensitivity similar to the first embodiment. However, the amount of saturation signal charge decreases a little bit.

Note that a simpler structure is sufficient to realize the variation under the condition that the third bias voltage is set at the same voltage value as the first bias voltage.

(First Footnote)

Consequently, a desirable timing for a substrate shutter will be explained as to the solid state image sensing apparatus in the second embodiment as the first footnote.

The above-mentioned second bias voltage is applied immediately after the substrate shutter pulse has been applied to the end of the readout period of the second field in FIG. 7, but it is possible to obtain an effect of improving a linear property even in the case of during or before the application of the substrate shutter pulse. Therefore, applying the second bias voltage during the whole exposure period increases the amount of the saturation signal charge Qs in the exposure period, which enlarges the linear area for determining a constant rate of the amount of the saturation signal charge Qs.

Further, desirably, the first bias voltage should be switched to the second bias voltage immediately after the substrate shutter pulse has been applied. Therefore, as the substrate shutter pulse is applied under the condition that the height of the overflow barrier (OFB) is set at a higher position in the case where the first bias voltage is switched to the second bias voltage during or before the application of the substrate shutter pulse, there occurs a glitch that a substrate shutter with a higher peak value is required for sweeping out signal charge.

Also, in the second embodiment, the shorter the time from the time when the electronic shutter finishes discharging the charge to the time when the first bias voltage is switched to the second bias voltage, the better. Therefore, the shorter the time until the first bias voltage is switched to the second bias voltage becomes, the longer the second bias voltage level in the exposure time becomes, which improves the exposure sensitivity.

In general, at the time of the high-speed electronic shutter (for example 1/2000 seconds), time for closing the mechanical shutter varies depending on various kinds of mechanical factors, and the exposure time, that is, the exposure amount varies by 10 percent, but the difference is considered to be practically allowable in camera systems. Therefore, the time that is allowed as the difference in the exposure time is about 10 percent of the exposure time. Therefore, it is desirable that the time period from the time when the electronic shutter finishes discharging the charge to the time when the first bias voltage is switched to the second bias voltage be within 10 percent of the exposure time.

For example, in the case where an allowable difference is determined as within 10 percent under the condition that the exposure time of a high-speed electronic shutter that is realized by the substrate shutter is 500 µs, it is desirable that the time difference be less than 50 µs.

Using the second bias voltage for the substrate bias Vsub during the whole exposure period in this way improves the efficiency of the photocarrier generation efficiency (quantum efficiency). As a result, it becomes possible to improve the exposure sensitivity. The improvement of the sensitivity improves the S/N ratio, which improves the picture quality at the time of imaging even under the condition that the luminance is low. Also, as to the improvement of the sensitivity, as the improvement rate is higher in the long-wave area, that is, the area ranging from Red (R) to Infrared (IR), it is possible to improve the performance in the case of using the solid state image sensing apparatus as a monitor camera or a night-vision camera.

(Second Footnote)

Consequently, a desirable voltage of a readout gate electrode while performing a horizontal scanning as the second footnote will be explained.

First, a horizontal validated period in the first field output period and in the second field output period in FIG. 7 is defined as follows. The horizontal validated period is the period during which a horizontal transmission operation is performed in the horizontal CCD 15 and a vertical transmission clock pulse does not change in the vertical CCDs 13.

In FIG. 7, in the first field output period, signal charge that forms the first field is read out to each vertical CCD 13 by applying the readout pulse XSG that is superimposed to the middle level voltage, in the subsequent horizontal validated period, the voltage $\phi V1$ of the readout gate electrode $\phi 1$ of the first field indicates the case of the middle level voltage (called VM readout case below). In contrast, in the first field output period, the case where voltage $\phi V1$ of the readout gate electrode $\phi 1$ of the first field may be the low level voltage in the first field output period (called VL readout case below). Likewise, it is arbitrary which case is used as the second field in the second field readout period.

In the interlace readout, as shown in FIG. 7, it is desirable that VM readout case be used in the first field. This is because blooming occurs less frequently in the case where the voltage of the readout gate electrode $\phi 3$ of the second field with remaining signal charge that has not been read out to the photodiode 11 yet is low level than in the case where the voltage is middle level. In the case where the first field is VM readout case, the voltage of the readout gate electrode $\phi 3$ of the second field in the horizontal validated period is low level. This is because the vertical transmission clock $\phi V1$ and $\phi V3$ are the first phase and the third phase of a four-phase clock signal, in general, in the case where one side is low level, the other side is middle level in the horizontal scanning period.

Therefore, in the case where a plurality of fields are read out in sequence after the mechanical shutter is closed, as shown in FIG. 7, in order to make the readout gate electrode $\phi 3$ of the second field that is not read out earlier at low level during the horizontal validated period, the first field that is red out earlier using the VM case. In other words, in the first field output period, the readout gate electrode $\phi 3$, which has not been read out in the first field output period, of the second field that stores charge in the photodiode 11 is not a middle level value which causes blooming more frequently, but a low level value which causes blooming less frequently. Therefore, the first field that is read out earlier, as no blooming occurs in the horizontal validated period that is read out later, the VM case for making the voltage middle level in the horizontal validated period is used for the readout gate electrode $\phi 1$ of the first field. In the case of not only a two-to-one interlace but also a many-to-one interlace, making the readout gate electrode of the field that has not been read out a low level value makes it possible to obtain the same result.

All of or a part of a substrate bias voltage generating circuit 20, a transistor Q1, Q2, the resistor R1 to R3, C may be formed on the substrate of the solid state image sensor 10 or the outside the substrate. Also, the substrate bias voltage generating circuit 20 may be the structure for generating the substrate bias voltage Vsub as a partial pressure by a register that is serially-connected between the power and the ground.

Also, in the above-mentioned embodiment, the case of a frame readout by an interline transfer method by a two-to-one interlace scanning has been explained as an example, but it may be the case of imaging where the exposure time is determined concurrently using a substrate shutter and a mechanical shutter 3, cases are not limited to this. For example, it may be a many-to-one interlace scanning method or a three-to-one interlace scanning method, or it may be reading out by a progressive scanning method.

Also, the solid state image sensor of the vertical overflow drain structure in the above-mentioned embodiment has been explained as an example, but the present invention is applicable in a similar manner even in the case where it has a horizontal overflow drain structure.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A solid state image sensing apparatus comprising:
a solid state image sensor with an overflow drain structure for discharging excessive charge that occurs in photodiodes to drains, the solid state image sensor having an electronic shutter function for discharging all charge stored in photodiodes to drains and transferring a signal charge by vertical charge coupled devices (CCDs) and a horizontal CCD, the signal charge being read out from photodiodes to vertical CCDs via readout gates;
a light shielding unit operable to shield the solid state image sensor from incoming light; and
a driver unit operable to control the signal charge by modulating a bias voltage for setting a height of an overflow barrier in the overflow drain structure,
wherein the driver unit performs a first bias modulation and a second bias modulation as the modulating of the bias voltage,
the height of the overflow barrier is made higher, in the first bias modulation, before an end of an exposure period starting from an end of discharge produced by the electronic shutter function to a closure of the light shielding unit, and
the height of the overflow barrier is made lower, in the second bias modulation, after the end of the exposure period and before sweeping out charge in the vertical CCDs.

2. The solid state image sensing apparatus according to claim 1,
wherein the driver unit sets the height of the overflow barrier at a higher position, in the first bias modulation, than a height of a barrier of a readout gate.

3. The solid state image sensing apparatus according to claim 1,
wherein the driver unit changes the height of the overflow barrier from a lower level to a higher level, in the first bias modulation, that is higher than a height of a barrier of a readout gate.

4. The solid state image sensing apparatus according to claim 1,
wherein the driver unit causes the height of the overflow barrier to be lower, in the second bias modulation, than a height of a barrier of a readout gate.

5. The solid state image sensing apparatus according to claim 1,
wherein the driver unit sets the height of the overflow barrier at a high position in the first bias modulation by changing a voltage from the first bias voltage to the second bias voltage which is lower than the first bias voltage, and the driver unit changes the voltage from the second bias voltage to a third bias voltage which is higher than the second bias voltage in the second bias modulation.

6. The solid state image sensing apparatus according to claim 5,
wherein the first bias voltage is a voltage for setting the height of the overflow barrier lower than a height of a barrier of a readout gate.

7. The solid state image sensing apparatus according to claim 5,
wherein the second bias voltage is a voltage for setting the height of the overflow barrier higher than a height of a barrier of a readout gate.

8. The solid state image sensing apparatus according to claim 5,
wherein the third bias voltage is a voltage for setting the height of the overflow barrier lower than a height of a barrier of a readout gate.

9. The solid state image sensing apparatus according to claim 1,
wherein the driver unit performs the first bias modulation immediately after an end of discharge by the electronic shutter function.

10. A solid state image sensing apparatus comprising:
a solid state image sensor with an overflow drain structure for discharging excessive charge that occurs in photodiodes to drains, the solid state image sensor having an electronic shutter function for discharging all charge that is stored in photodiodes to drains and transferring a signal charge by vertical charge coupled devices (CCDs) and a horizontal CCD, the signal charge is read out from photodiodes to vertical CCDs via readout gates;
a light shielding unit operable to control incoming light to the solid state image sensor; and
a driver unit operable to control the signal charge by modulating a bias voltage for setting a height of an overflow barrier in the overflow drain structure,
wherein the driver unit performs a first bias modulation and a second bias modulation as the modulating of the bias voltage,
the height of the overflow barrier is made higher, in the first bias modulation, before an end of an exposure period starting from an end of discharge produced by the electronic shutter function to a closure of the light shielding unit, and
the height of the overflow barrier is made temporally lower and then higher, in the second bias modulation, after the end of the exposure period and before sweeping out charge in the vertical CCDs.

11. The solid state image sensing apparatus according to claim 10,
wherein the driver unit sets the height of the overflow barrier at a higher position, in the first bias modulation, than a height of a barrier in a readout gate.

12. The solid state image sensing apparatus according to claim 10,
wherein the driver unit changes the height of the overflow barrier from a lower level to a higher level, in the first bias modulation, that is higher than a height of a barrier in a readout gate.

13. The solid state image sensing apparatus according to claim 10,
wherein the driver unit causes the height of the overflow barrier to be lower, in a second bias modulation, than a height of a barrier of a readout gate.

14. The solid state image sensing apparatus according to claim 10,
wherein the driver unit sets the height of the overflow barrier at a high position, in the first bias modulation, by changing a voltage from the first bias voltage to the second bias voltage which is lower than the first bias voltage and causes the height of the overflow barrier to be temporally lower, in the second bias modulation, by superimposing a control pulse on the second bias voltage, the control pulse being for controlling a saturation signal amount.

15. The solid state image sensing apparatus according to claim 14,
wherein the first bias voltage is a voltage for setting the height of the overflow barrier lower than a height of a barrier of a readout gate.

16. The solid state image sensing apparatus according to claim 14,
wherein the second bias voltage is a voltage for setting the height of the overflow barrier higher than a height of a barrier of a readout gate.

17. The solid state image sensing apparatus according to claim 14,
wherein a high-level voltage of the control pulse is a voltage for setting the height of the overflow barrier at a lower position than a height of a barrier of a readout gate.

18. The solid state image sensing apparatus according to claim 14,
wherein a high-level voltage of the control pulse is equal to the first bias voltage.

19. The solid state image sensing apparatus according to claim 14,
wherein a high-level voltage of the control pulse is higher than the first bias voltage.

20. The solid state image sensing apparatus according to claim 14,
wherein a high-level voltage of the control pulse is lower than the first bias voltage.

21. The solid state image sensing apparatus according to claim 10,
wherein the first bias modulation is performed immediately after an end of discharge by the electronic shutter function.

22. A driving method for the solid state image sensing apparatus which includes: a solid state image sensor which has an overflow drain structure for discharging excessive charge that occurs in photodiodes to drains, has an electronic shutter function for discharging all charge stored in photodiodes to drains and transfers a signal charge by vertical charge coupled devices (CCDs) and a horizontal CCD, the signal charge being read out from photodiodes to vertical CCDs via readout gates; a light shielding unit which controls incoming light to the solid state image sensor; and a driver unit which controls the signal charge by modulating a bias voltage for setting a height of an overflow barrier in the overflow drain structure, the driving method comprising:
performing a first bias modulation, as a part of the modulating of the bias voltage, where the height of the overflow barrier is made higher before an end of an exposure period starting from an end of discharge produced by the electronic shutter function to a closure of the light shielding unit, and
performing a second bias modulation, as a part of the modulating of the bias voltage, where the height of the overflow barrier is made lower after the end of the exposure period and before sweeping out charge in the vertical CCDs.

23. The driving method according to claim 22,
wherein the height of the overflow barrier is set at a higher position, in the first bias modulation, than a height of a barrier of a readout gate.

24. The driving method according to claim 22,
wherein the height of the overflow barrier is changed from a lower level to a higher level, in the first bias modulation, that is higher than a height of a barrier of a readout gate.

25. The driving method according to claim 22,
wherein the height of the overflow barrier is lowered, in a second bias modulation, to be lower than a height of a barrier of a readout gate.

26. The driving method according to claim 22,
wherein the height of the overflow barrier is set at a high position in the first bias modulation by changing a voltage from the first bias voltage to the second bias voltage which is lower than the first bias voltage, and the voltage from the second bias voltage to a third bias voltage which is higher than the second bias voltage in the second bias modulation.

27. The driving method according to claim 26,
wherein the first bias voltage is a voltage for setting the height of the overflow barrier lower than a height of a barrier of a readout gate.

28. The driving method according to claim 26,
wherein the second bias voltage is a voltage for setting the height of the overflow barrier higher than a height of a barrier of a readout gate.

29. The driving method according to claim 26,
wherein the third bias voltage is a voltage for setting the height of the overflow barrier lower than a height of a barrier of a readout gate.

30. The driving method according to claim 22,
wherein the first bias modulation is performed immediately after an end of discharge by the electronic shutter function.

31. A driving method for the solid state image sensing apparatus which includes: a solid state image sensor which has an overflow drain structure for discharging excessive charge that occurs in photodiodes to drains, has an electronic shutter function for discharging all charge stored in photodiodes to drains and transfers a signal charge by vertical charge coupled devices (CCDs) and a horizontal CCD, the signal charge being read out from photodiodes to vertical CCDs via readout gates; a light shielding unit which controls incoming light to the solid state image sensor; and a driver unit which controls the signal charge by modulating a bias voltage for setting a height of the overflow barrier in an overflow drain structure, the driving method comprising:
performing a first bias modulation, as a part of the modulating of the bias voltage, where the height of the overflow barrier is made higher before an end of an exposure period starting from an end of discharge produced by the electronic shutter function to a closure of the light shielding unit, and
performing a second bias modulation, as a part of the modulating of the bias voltage, where the height of the overflow barrier is made temporally lower and then higher after the end of the exposure period and before sweeping out charge in the vertical CCDs.

32. The driving method according to claim 31,
wherein the height of the overflow barrier is set at a higher position, in the first bias modulation, than a height of a barrier in a readout gate.

33. The driving method according to claim 31,
wherein the height of the overflow barrier is changed from a lower level to a higher level, in the first bias modulation, that is higher than a height of a barrier of a readout gate.

34. The driving method according to claim 31,
wherein the height of the overflow barrier is lowered, in a second bias modulation, than a height of a barrier of a readout gate.

35. The driving method according to claim 31,
wherein the driver unit sets the height of the overflow barrier at a high position in the first bias modulation by changing a voltage from the first bias voltage to the second bias voltage which is lower than the first bias voltage and causes the height of the overflow barrier to be temporally lower, in the second bias modulation, by superimposing a control pulse on the second bias voltage.

36. The driving method according to claim 35,
wherein the first bias voltage is a voltage for setting the height of the overflow barrier lower than a height of a barrier of a readout gate.

37. The driving method according to claim 35,
wherein the second bias voltage is a voltage for setting the height of the overflow barrier higher than a height of a barrier of a readout gate.

38. The driving method according to claim 35,
wherein a high-level voltage of the control pulse is a voltage for setting the height of the overflow barrier at a lower position than a height of a barrier of a readout gate.

39. The driving method according to claim 35,
wherein a high-level voltage of the control pulse is equal to the first bias voltage.

40. The driving method according to claim 35,
wherein a high-level voltage of the control pulse is higher than the first bias voltage.

41. The driving method according to claim 35,
wherein a high-level voltage of the control pulse is lower than the first bias voltage.

42. The driving method according to claim 31,
wherein the first bias modulation is performed immediately after an end of discharge by the electronic shutter function.

\* \* \* \* \*